United States Patent [19]

Schellenberg

[11] 3,713,210

[45] Jan. 30, 1973

[54] TEMPERATURE STABILIZED COMPOSITE YIG FILTER PROCESS

[75] Inventor: James M. Schellenberg, Glen Burnie, Md.

[73] Assignee: Westinghouse Electric Corporation, Pittsburgh, Pa.

[22] Filed: Oct. 15, 1970

[21] Appl. No.: 80,986

[52] U.S. Cl. ........................29/593, 29/602, 29/608, 333/24.1, 333/73.6

[51] Int. Cl. ........................................H01p 11/00

[58] Field of Search .........333/24.1, 73; 29/593, 592, 29/602, 608

[56] References Cited

UNITED STATES PATENTS

| | | | |
|---|---|---|---|
| 3,246,263 | 4/1966 | Clark | 333/24.1 |
| 3,368,169 | 2/1968 | Carter et al. | 333/24.1 X |
| 3,504,305 | 2/1970 | Cohen | 333/73.6 |

OTHER PUBLICATIONS

Microwave Ferrites by Clarrocoats - Jan. 1967-pgs. 74-85 relied upon.

*Primary Examiner*—Charles W. Lanham
*Assistant Examiner*—Robert W. Church
*Attorney*—F. H. Henson and E. P. Klipfel

[57] ABSTRACT

A method whereby the variation with temperature of the biasing magnetic field of a device such as a YIG filter is cancelled by the temperature sensitive anisotropy drift of the YIG resonator element. From the knowledge of the anisotropy variation with temperature and the change in the resonant frequency of the filter over a predetermined temperature interval, a correctional frequency to which the YIG sphere must be rotated is obtained. A subsequent rotation to this frequency will provide a change in the anisotropy field such that the variation with temperature of the biasing field will be matched by a corresponding opposite change in the anisotropy field.

11 Claims, 7 Drawing Figures

TEMPERATURE STABILIZED COMPOSITE YIG FILTER PROCESS

BACKGROUND OF THE INVENTION

1. Field of the Invention

This invention relates to temperature stabilization of electromagnetic wave devices utilizing magnetically polarizable gyromagnetic materials and more particularly relates to the cancellation of the variation with temperature of permanent magnets used for tuning the gyromagnetic specimen with an opposite temperature variation of the anisotropy field of the specimen.

2. Description of the Prior Art

One of the major problems encountered in the development of microwave resonators utilizing the high-Q characteristics of gyromagnetic material such as yttrium iron garnet, commonly referred to as YIG, is temperature instability. This instability results from two significant sources. The first of these which is anisotropy drift is a characteristic that is internal to the YIG coupling element since it stems directly from temperature induced variations in crystalline anisotropy. The other source of instability is appropriately characterized as external. It results from temperature induced variations of the externally applied magnetic biasing source. Either or both of these variations will result in a change in the resonant or operating frequency of the YIG device.

The internal crystalline anisotropy field $H_a$ in YIG adds to the externally applied magnetic field $H_0$, thereby contributing to the effective field $H_{eff}$ within the magnetic medium. It is this effective field $H_{eff}$ that directly determines the ferromagnetic resonant frequency $f_r$. Therefore, the temperature dependence of the anisotropy field results in resonant frequency temperature dependence. In addition to being temperature dependent, the anisotropy field $H_a$ is also a function of the orientation of the magnetization vector $\theta$ in the crystalline lattice.

In the past it has been found that if the external biasing field $H_0$ is directed at an angle of 29°– 40 min. from the [100] crystallographic direction in the (110) plane, the effect of the anisotropy field $H_a$ on ferromagnetic resonance $f_r$ in YIG vanishes. This is taught, for example, in U.S. Pat. No. 3,246,263 issued to J. G. Clark. This angular position, however, is highly critical. If the YIG is oriented with only one degree error, the resonant frequency will drift approximately 5MHz for a temperature change of 10°C. This anisotropy cancellation effect is not unique to the above referenced crystallographic plane. Many planes exist within the YIG crystal which exhibit this phenomenon. In fact, anisotropy cancellation directions from continuous surfaces about each [100] direction. Reference is made to U.S. Pat. No. 3,409,823 issued to E.R. Czerlinsky, et al.

The second source of temperature instability in YIG filters as noted above is the permanent magnet biasing field $H_0$. It is this biasing field that directly determines the ferromagnetic resonant frequency. Therefore, any variation in the biasing field is reflected by a corresponding change in the filter resonant frequency $f_r$. Permanent magnets exhibit temperature dependence due to the temperature dependent nature of the saturation magnetization. Most magnetic materials closely approximate the "Curie-Weiss Law" which predicts a decreasing magnetic field as the temperature is increased until the Curie temperature is reached. Typically, the problem of the temperature sensitive magnetic biasing source is solved by incorporating temperature compensating magnetic shunts on the permanent magnets such as disclosed in U.S. Pat. No. 3,030,593 issued to W. H. Von Aulock.

Additionally, Westinghouse Case No. 41,459 now co-pending U.S. application Ser. No. 42,048 filed on June 1, 1970 now U.S. Pat. No. 3,648,199 entitled "-Temperature Independent YIG Filter," filed in the names of Daniel C. Buck and James M. Schellenberg discloses a means for temperature compensating a YIG filter by first reducing the temperature dependence of the externally applied magnetic field to a low level and then off-setting the remainder of this temperature dependence by selective orientation of the YIG element.

SUMMARY

The present invention comprises a method of eliminating temperature dependence of a YIG filter over a predetermined temperature range without the use of shunts on the permanent magnet biasing source and without the high precision orientation of the YIG resonator element normally necessary to eliminate anisotropy drift. Briefly, the method comprises mounting a randomly oriented YIG sphere into a filter structure including a permanent magnet supplying a magnetic biasing field thereto, measuring the change in the resonant frequency of the composite YIG filter over a selected temperature range, determining a correctional frequency from the measured change in resonant frequency in view of the anisotropy characteristic of the YIG element over the selected temperature range, and rotating the YIG element in the filter with respect to the direction of the biasing magnetic field to the correctional resonant frequency wherein the temperature induced biasing field drift is exactly matched by a corresponding opposite change in the anisotropy field drift.

DESCRIPTION OF THE PREFERRED METHOD

It is the object of the present invention to provide an improved method of eliminating temperature dependence of a device utilizing magnetically polarizable gyromagnetic materials over a specified temperature range without the use of shunts on the permanent magnet biasing source and without the high precision orientation of the gyromagnetic specimen normally necessary to eliminate the anisotropy drift such as taught in U.S. Pat. No. 3,246,263.

Figure 1:
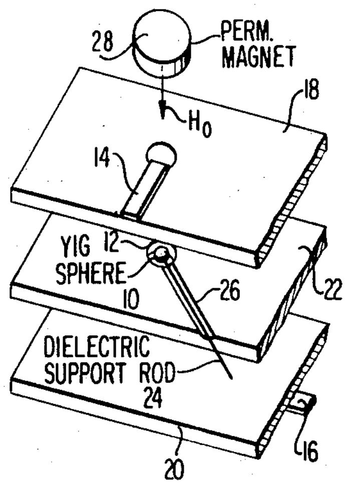
FIG. 1 is a simplified perspective illustration of a composite YIG filter.

Referring now to the drawings and more particularly to FIG. 1, there is disclosed for purposes of illustration one type of electromagnetic wave device utilizing magnetically polarizable gyromagnetic materials such as yttrium iron garnet, gallium substituted yttrium iron garnet, lithium ferrite or a similar single cubic crystal material suitable for use in known device of this type. In the present invention, yttrium iron garnet or simply YIG is the preferred material and will be used throughout the following description of the invention. It is utilized as a small highly polished sphere 10 located in an iris 12 between a first and a second conductor 14 and 16 of electromagnetic waves oriented substantially 90° with respect to one another on the outer surface of respective dielectric members 18 and 20. The iris 12 is located in a metallic ground plane 22 sandwiched between the dielectric members 18 and 20. The YIG sphere 10 is attached to a dielectric support rod 24 which is adapted to extend through a channel 26 in the ground plane 22 to the outside so that the YIG sphere 10 can be rotated about an axis perpendicular to the biasing magnetic field $H_o$ produced by a permanent magnet 28.

As is well known, the YIG sphere 10 functions as a resonator to couple electromagnetic wave energy between the conductors 14 and 16. This coupling occurs at the gyromagnetic resonant frequency $f_r$ which is selectively controlled by the application of the magnetic biasing field $H_o$ applied therethrough. Electromagnetic wave devices of this type can provide reciprocal and non-reciprocal coupling, attenuation, phase shift, power limiting, frequency conversion, etc. The effective internal magnetizing field $H_{eff}$ within the YIG sphere 10 is a function of the saturation magnetization $M_s$ of the material, the applied biasing magnetic field $H_o$the anisotropy field $H_a$ associated with single crystal YIG, and the demagnetization field $H_d$. Additionally, these fields are functionally related to the shape of the specimen of the material used. The saturation magnetization $M_s$, the anisotropy field $H_a$ and the demagnetization field $H_d$ are all temperature dependent so that the internal magnetizing field $H_{eff}$ varies as the temperature of the material changes due to changes in ambient temperature and/or because of the rising temperature resulting from the absorption of electromagnetic wave energy within the material. The present invention discloses the use of a small highly polished single crystal YIG sphere 10 because the effects of the saturization magnetization term $M_s$ and the demagnetization field $H_d$ are essentially eliminated thereby.

The effective field for gyromagnetic resonance in a single crystal YIG sphere may be expressed by the equation:

$$H^2_{eff} = [H_o + f_1(\theta)H_a]\,[H_o + f_2(\theta)\,H_a] \qquad (1)$$

Wherein $H_{eff}$ is the effective internal magnetic field required for gyromagnetic resonance.

$H_o$ is the externally applied biasing magnetic field, $H_a$ is the internal crystalline anisotropy field (a negative quantity for YIG) which is equal to $K_1/4\pi M_s$ where $K_1$ is the first order anisotropy constant and $M_s$ is the saturation magnetization of the material, $f_1(\theta)$ and $f_2(\theta)$ are trigonometric functions related to the torque exerted by the anisotropy field on the magnetization vector, and $\theta$ is the angle between $H_o$ and a crystallographic reference direction in the plane of interest. For example, if by orientation of the gyromagnetic specimen, the biasing field $H_o$ is restricted is the (110) crystallographic plane, the functions of $f_1(\theta)$ and $f_2(\theta)$ can be expressed as $$f_1(\theta) = 2 - \sin^2\theta - 3\sin^2 2\theta$$

$$f_2(\theta) = 2 - 4\sin^2\theta - \tfrac{3}{4}\sin^2 2\theta$$

where $\theta$ is the angle between $H_o$ and the [100] crystallographic direction.

Equation (1) can be restated in terms of the gyromagnetic resonance frequency $f_r$ as:

$$f_r = \gamma\left\{[H_o + f_1(\theta)H_a]\,[H_o + f_2(\theta)H_a]\right\}^{1/2} \qquad (2)$$

wherein $\gamma$ is the gyromagnetic ratio for an electron (2.8MHz/oersted). Since the ratio of $H_o$ to $H_a$ for YIG at all temperatures of practical interest is greater than 10, the resonant frequency is given to a first order approximation by $$f_r = \gamma\left\{H_o + \tfrac{1}{2}H_a\,[f_1(\theta) + f_2(\theta)]\right\} \qquad (3)$$

Substituting F ($\theta$) for the term $\frac{1}{2}[f_1(\theta) + f_2(\theta)]$, the resonant frequency expressed by equation (3) reduces to $$f_r = \gamma[H_o + F(\theta)\,H_a] \qquad (4)$$

Figure 2:
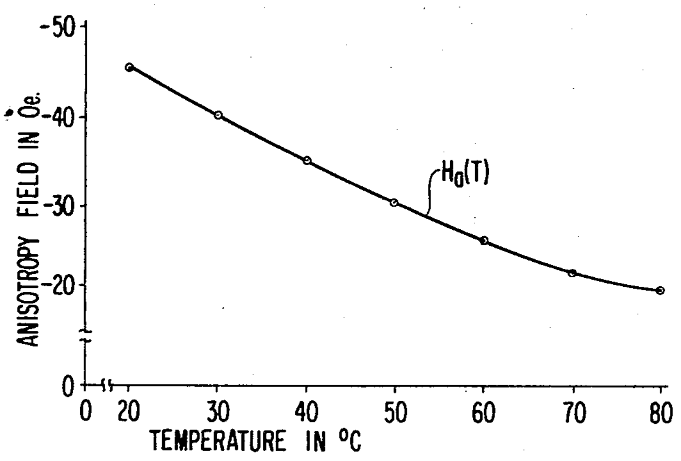
FIG. 2 is a diagrammatic illustration of crystallographic planes and directions of Miller indices of a cubic crystal of gyromagnetic material helpful in understanding the present invention.

The function F($\theta$) is only dependent upon the orientation of the biasing magnetic field $H_o$ in the crystalline lattice. In YIG it can vary over the range from +2 to −4/3 depending upon the orientation of the biasing magnetic field $H_o$ relative to the [100] and [111] crystallographic direction or axis of Miller indices. The crystallographic (100) and (111) plane are normal to the respective directions. This is shown for example by FIG. 2 wherein the (100) plane forms one face of a cube of gyromagnetic material such as YIG. The (111) plane comprises an oblique plane as shown. The (110) plane, not shown, constitutes a diagonal plane through the cube. FIG. 2 also discloses the biasing magnetic field $H_o$ oriented in the [100] direction. Such an orientation, moreover, will provide a +2 value for the function F($\theta$).

Figures 3, 4:
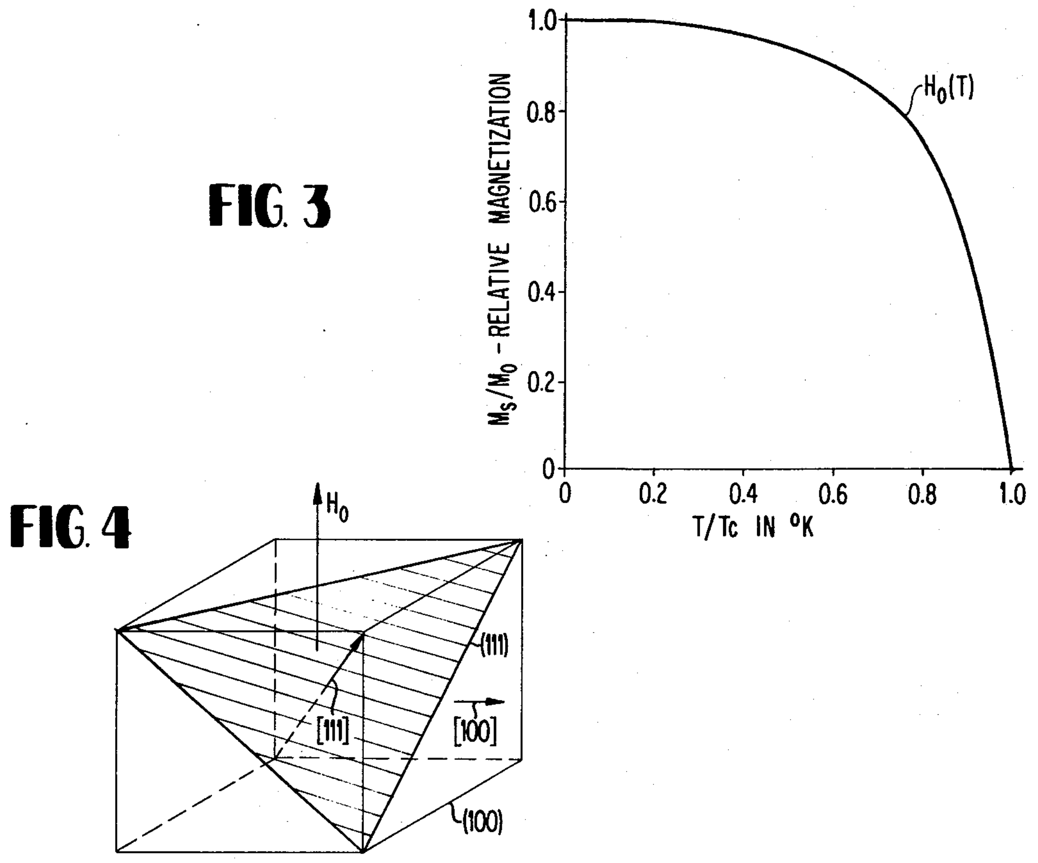
FIG. 3 is a graph illustrating the change in the anisotropy field as a function of temperature of gyromagnetic material such as YIG.
FIG. 4 is a diagram illustrative of the temperature dependence of the magnetic field produced by a permanent magnet.

Reference to FIGS. 3 and 4 indicate that both the biasing magnetic field $H_o$ and the anisotropy field $H_a$ are temperature dependent. FIG. 4 indicates that between the temperatures of 20° and 80° Centigrade, the magnitude of the anisotropy field $H_a$ decreases almost linearly. The biasing field $H_o$, however, has a temperature dependent characteristic which approximates the "Curie-Weiss Law" which predicts a decreasing magnetic field as the temperature is increased until the Curie temperature is reached. It can also be seen that the slopes of the two functions $H_a$ and $H_o$ are considerably different.

Equation (4) however indicates that if the resonant frequency $f_r$ is to be stabilized against temperature variation, a change in the biasing field $H_o$ must be matched by a corresponding opposite change in the term $F(\theta)\ H_a$ which includes the anisotropy field. Stated more precisely, $$(dH_o)/(dT)=(-d)/(dT)\ [F(\theta)H_a]=-F(\theta)\ (dH_a)/(dT)$$

Figure 5:
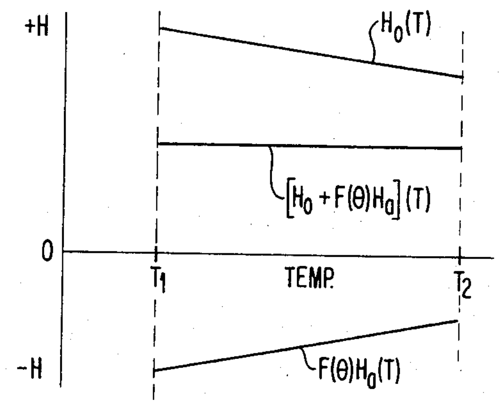
FIG. 5 is a diagram illustrative of the desired temperature stabilization obtained by the subject invention.

By selecting a permanent magnet material with a sufficiently high Curie temperature, the resultant slope of the $H_o$ curve is reasonably constant over a limited temperature range such as shown by the curve $H_o\ (T)$ in FIG. 5. An example of such a magnetic material is an aluminum-nickel-cobalt alloy composition known to those skilled in the art as "Alnico 8." Such a material has a Curie temperature $T_c$ of 830° C and a temperature coefficient of approximately −0.004%/°C at 25°C. Another type of low temperature coefficient magnet material which may be used when desired is a composition known as Samarium-Cobalt.

In terms of induced frequency drift of the resonant frequency of $f_r$ of a YIG filter utilizing "Alnico 8," the slope of the permanent magnet is −0.2MHz/°C at S-band range of frequencies in the microwave region of the electromagnetic spectrum. The slope of the anisotropy vs. temperature curve shown in FIG. 3 for YIG however is approximately +0.5 oersted/°C or +1.5MHz/C at 25°C. Therefore in order to realize a temperature stable filter, the term $F(\theta)$ must be a positive quantity with a magnitude of approximately 0.13, i.e., +0.13. This would have the effect of providing a positive slope for the term $F(\theta)H_a(T)$ as illustrated by FIG. 5 and the curve designated accordingly. It is thus possible to provide upper and lower matching curves such as shown in FIG. 5 to provide a composite temperature invarient term $[H_o+F(\theta)\ H_a](T)$.

Figure 6:
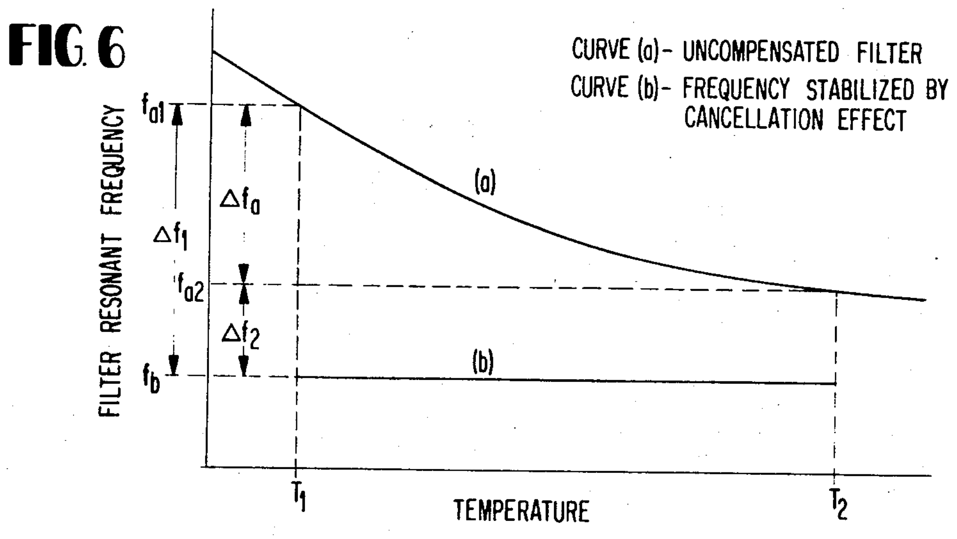
FIG. 6 is a graph illustrative of the method taught by the subject invention for obtaining the desired temperature stability.

The present invention has for its object the provision of a practical method for physically orienting a YIG sphere such as shown by reference numeral 10 in FIG. 1 in the biasing field $H_o$ so that a cancellation of effects is achieved as described mathematically above. Referring now to FIG. 6, curve A illustrates a typical temperature response curve of an uncompensated YIG filter with the YIG sphere randomly oriented in the biasing field $H_o$. Curve B on the other hand illustrates the desired temperature response of a stabilized YIG filter over the temperature range $T_1$ to $T_2$. Furthermore, the present invention is directed to a method for obtaining a characteristic such as curve B of FIG. 6 by rotating the YIG sphere in the biasing field $H_o$.

From equation (4), curves A and B can be expressed as, $$f_a=\gamma[H_o+F(\theta_a)\ H_a] \qquad (6)$$

$$f_b=\gamma[H_o+F(\theta_b)\ H_a] \qquad (7)$$

In the temperature range from $T_1$ to $T_2$, respectively, $$(f_a-f_b)\ T_1=\Delta f_1=\gamma H_{a1}\ [F(\theta_a)-F(\theta_b)] \qquad (8)$$

$$(f_a-f_b)\ T_2=\Delta f_2=\gamma H_{a2}\ [F(\theta_a)-F(\theta_b)] \qquad (9)$$

Eliminating of the quantity $[F(\theta_a)-F(\theta_b)]$ between equations (8) and (9) yields the following, $$f_2=\Delta f_1\ (H_{a2})/(H_{a1}) \qquad (10)$$

Equation (10) states that if the YIG sphere is rotated at temperature $T_1$ such that the resonant frequency changes by $\Delta f_1$ the corresponding change in the frequency at temperature $T_2$ will be $\Delta f_1\ (H_{a2})/(H_{a1})$. If the resonant frequency $f_b$ at $T_1$ is made equal to $f_b$ at $T_2$, equation (10) can be solved yielding a temperature compensated resonant frequency $f_b$ which can be expressed as, $$f_b=f_{a1}-\frac{\Delta f_a}{1-\frac{H_{a2}}{H_{a1}}} \qquad (11)$$

Equation (11) indicates that having a knowledge of the anisotropy curve of the gyromagnetic element utilized, such as the curve for YIG as shown in FIG. 3, and observing the change in frequency over the temperature range of $T_1$ to $T_2$ of a randomly oriented gyromagnetic specimen such as a YIG sphere, the frequency to which the YIG sphere must be rotated, i.e., $f_b$ can be determined. By then orienting the gyromagnetic specimen to the new frequency $f_b$, the composite YIG filter will be temperature stabilized over the selected temperature range between $T_1$ and $T_2$. Since in general the resonant frequency of a YIG filter can be determined more accurately than the angular position of the sphere, it is desirable to express YIG rotation in terms of frequency.

Therefore, the method for temperature stabilizing a composite gyromagnetic filter utilizing a gyromagnetic specimen comprised of YIG can be effected by mounting a randomly oriented YIG sphere to a dielectric support rod and then inserting the YIG sphere with the attached rod into the filter structure such as shown in FIG. 1. Next the change in the resonant frequency of the composite YIG filter over the desired temperature range of operation is observed by a suitable measurement technique. Following this, a correctional resonant frequency $f_b$ is determined according to equation (11) from the measured change in resonant frequency over the temperature range of interest in view of the anisotropy characteristic of the YIG. The determination of the correctional resonant frequency can be accomplished by any desired means which may even include analog or digital computer apparatus suitably operated. Having determined the correctional resonant frequency $f_b$, the YIG sphere is rotated in the filter structure to the frequency $f_b$.

The method described herein is not limited to the compensation of the biasing field Curie-Weiss effect. This method allows for any reversible temperature induced change such as thermal expansions and contractions of the filter structure. The overall result is the same in that the variation of the biasing field with temperature, whatever the phenomenon producing the change, is compensated by a corresponding opposite change in the effective anisotropy field.

Figure 7:
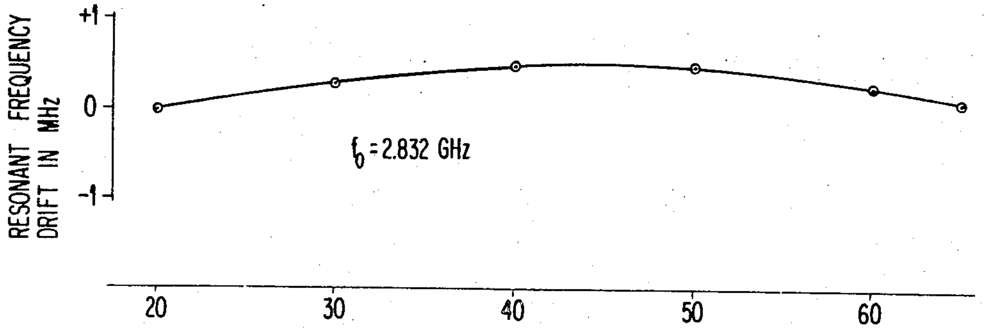
FIG. 7 is a graph disclosing illustrative experimental results obtained by means of the subject invention.

Reference to FIG. 7 illustrates experimental data obtained from a composite YIG filter which was stabilized by the method described immediately above. The objective was to stabilize a filter to ±0.5MHz over a temperature interval of 20°C to 65°C. The data indicates a total deviation of only 0.5MHz over this interval.

The method thus described for compensating YIG filters is superior to other means in that temperature compensating shunts are eliminated from the biasing magnets and the expensive and time consuming preorientation of the YIG sphere is eliminated. Furthermore, the method described by the subject invention is inherently more accurate and simpler to perform.

Therefore, I claim as my invention:

1. The method of temperature stabilizing an electromagnetic wave device utilizing a gyromagnetic specimen by cancelling the drift of the biasing magnetic field with the anisotropy field drift of the specimen over a predetermined temperature range comprising the steps of:

- locating the electromagnetic wave device within a biasing magnetic field;
- mounting said specimen of gyromagnetic material in said wave device, said specimen being randomly oriented with respect to the direction of said biasing magnetic field;
- observing the change in the resonant frequency of said device over said predetermined temperature range;
- determining a correctional resonant frequency from the observed change in said resonant frequency in view of the anisotropy characteristic of said specimen over said predetermined temperature range; and
- rotating said randomly oriented specimen in said wave device until said correctional resonant frequency is obtained at one temperature of said temperature range whereby said wave device will be substantially temperature independent over said temperature range.

2. The method as defined by claim 1 and additionally including the step of generating a DC magnetic biasing field, utilizing a magnetic material having a relatively high Curie temperature.

3. The method as defined in claim 2 wherein said magnetic material comprises a composition of aluminum-nickel-cobalt.

4. The invention as defined by claim 3 wherein said gyromagnetic specimen comprises yttrium-iron-garnet.

5. The invention as defined by claim 4 wherein said specimen of yttrium-iron-garnet is configured in the form of a sphere.

6. The invention as defined by claim 1 wherein the step of determining said correctional resonant frequency results from solving the equation, $$f_b = f_{a1} - \frac{\Delta f_a}{1 - \frac{H_{a2}}{H_{a1}}}$$

wherein $f_b$ is the correctional resonant frequency, $f_{a1}$ is the observed resonant frequency of said wave device for a randomly oriented specimen at the lower temperature limit of said predetermined temperature range, $\Delta f_a$ is the observed change in resonant frequency of the randomly oriented specimen over said predetermined temperature range, $H_{a1}$ is the anisotropy field of said specimen at said lower temperature limit, and $H_{a2}$ is the anisotropy field of said specimen at the upper temperature limit of said predetermined temperature range.

7. The invention as defined by claim 6 and additionally generating said magnetic field utilizing a permanent magnet having a relatively high Curie temperature and relatively low temperature coefficient.

8. The invention as defined by claim 6 wherein one temperature corresponds to said lower temperature limit.

9. The invention as defined by claim 8 and wherein said gyromagnetic specimen comprises a sphere of YIG.

10. The invention as defined by claim 9 and wherein said magnetic field is produced utilizing a magnet comprising an aluminum-nickel-cobalt alloy.

11. The invention as defined by claim 9 and wherein said magnetic field is produced utilizing a magnet comprising a samarium-cobalt alloy.

* * * * *